United States Patent
Wang et al.

(10) Patent No.: US 10,038,360 B2
(45) Date of Patent: Jul. 31, 2018

(54) VIBRATION MOTOR

(71) Applicants: Hongxing Wang, Shenzhen (CN); Lubin Mao, Shenzhen (CN)

(72) Inventors: Hongxing Wang, Shenzhen (CN); Lubin Mao, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 185 days.

(21) Appl. No.: 15/070,115

(22) Filed: Mar. 15, 2016

(65) Prior Publication Data

US 2017/0033663 A1  Feb. 2, 2017

(30) Foreign Application Priority Data

Jul. 31, 2015 (CN) .................... 2015 2 0572969 U

(51) Int. Cl.
*H02K 33/00* (2006.01)
*H02K 33/12* (2006.01)
*H02K 33/16* (2006.01)

(52) U.S. Cl.
CPC .......... *H02K 33/00* (2013.01); *H02K 33/12* (2013.01); *H02K 33/16* (2013.01)

(58) Field of Classification Search
CPC ........ H02K 33/00; H02K 33/02; H02K 33/16; H02K 33/18
USPC .......................................... 310/25, 12.05, 15
IPC ....................................................... H02K 33/00
See application file for complete search history.

(56) References Cited

U.S. PATENT DOCUMENTS

| | | | | |
|---|---|---|---|---|
| 6,747,631 | B1 * | 6/2004 | Sakamaki | G01L 1/14 345/157 |
| 8,269,379 | B2 * | 9/2012 | Dong | H02K 33/16 310/25 |
| 2011/0204732 | A1 * | 8/2011 | Miyamoto | H02K 33/16 310/25 |
| 2013/0193779 | A1 * | 8/2013 | Kuroda | H02K 33/12 310/15 |
| 2014/0084710 | A1 * | 3/2014 | Endo | B06B 1/045 310/25 |
| 2015/0207392 | A1 * | 7/2015 | Iwakura | H02K 33/00 310/25 |
| 2016/0013710 | A1 * | 1/2016 | Dong | H02K 33/16 310/25 |
| 2017/0033663 | A1 * | 2/2017 | Wang | H02K 33/00 |

* cited by examiner

*Primary Examiner* — John K Kim
(74) *Attorney, Agent, or Firm* — Na Xu; IPro, PLLC

(57) ABSTRACT

A vibration motor includes a cover; a substrate forming an accommodation space together with the cover; a vibrator received in the accommodation space, the vibrator including a first driver and a second driver; a plurality of elastic members suspending the vibrator in the accommodation space; a third driver mounted on the substrate for generating a first force cooperatively with the first driver to drive the vibrator to vibrate along a first direction; and a fourth driver mounted on the substrate for generating a second force cooperatively with the second driver to drive the vibrator to vibrate along a second direction.

11 Claims, 5 Drawing Sheets

VIBRATION MOTOR

FIELD OF THE DISCLOSURE

The present disclosure generally relates to vibration motors, and more particularly to a vibration motor used in a portable consumer electronic device.

BACKGROUND

With the development of the electronic technologies, portable consumer electronic devices are more popular and desired by people. A portable consumer electronic device, such as a wireless communication device, generally includes a vibration motor sued for generating tactile feedback.

Typically, flat linear vibration motors are commonly used. A flat linear vibration motor includes an elastic member, a vibration unit suspended by the elastic member, and a housing for accommodating the elastic member and the vibration unit therein. The elastic member is generally welded to the vibration unit. Such a vibration motor only has one resonant frequency, at which the vibration motor has maximum vibration amplitude. For some certain applications, the vibration motor needs two resonant frequencies for performing desired requirements. Such a typical vibration motor, as described in JP Publication No. 1993-85192, cannot satisfy the requirements.

For this reason, it is necessary to provide a novel vibration motor to overcome the shortcomings above.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and exemplary embodiments thereof.

Figure 1:
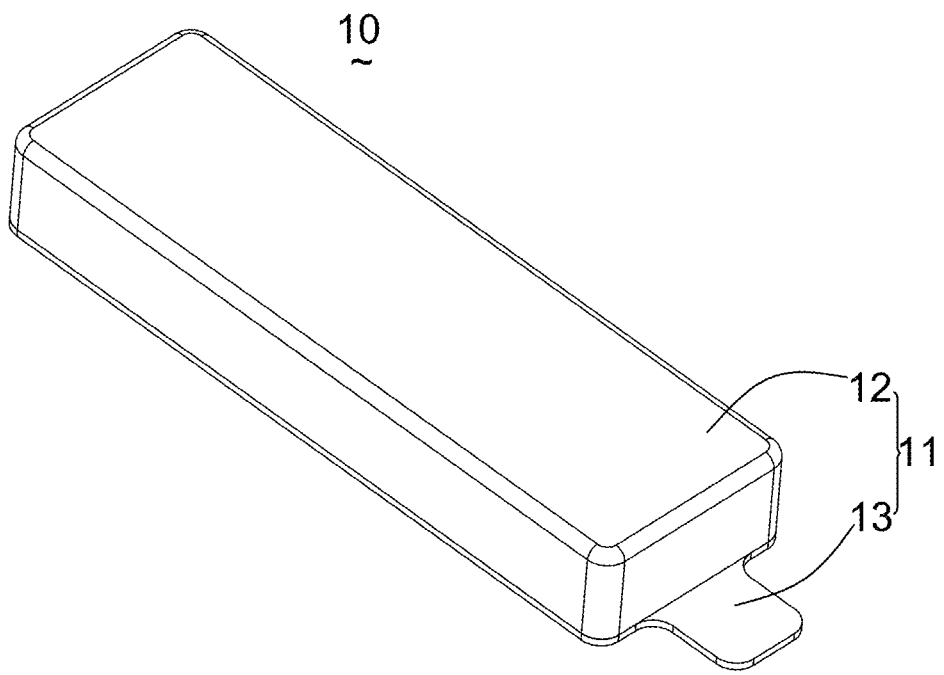
FIG. 1 is an isometric view of a vibration motor in accordance with a first exemplary embodiment of the present disclosure.
Figure 2:
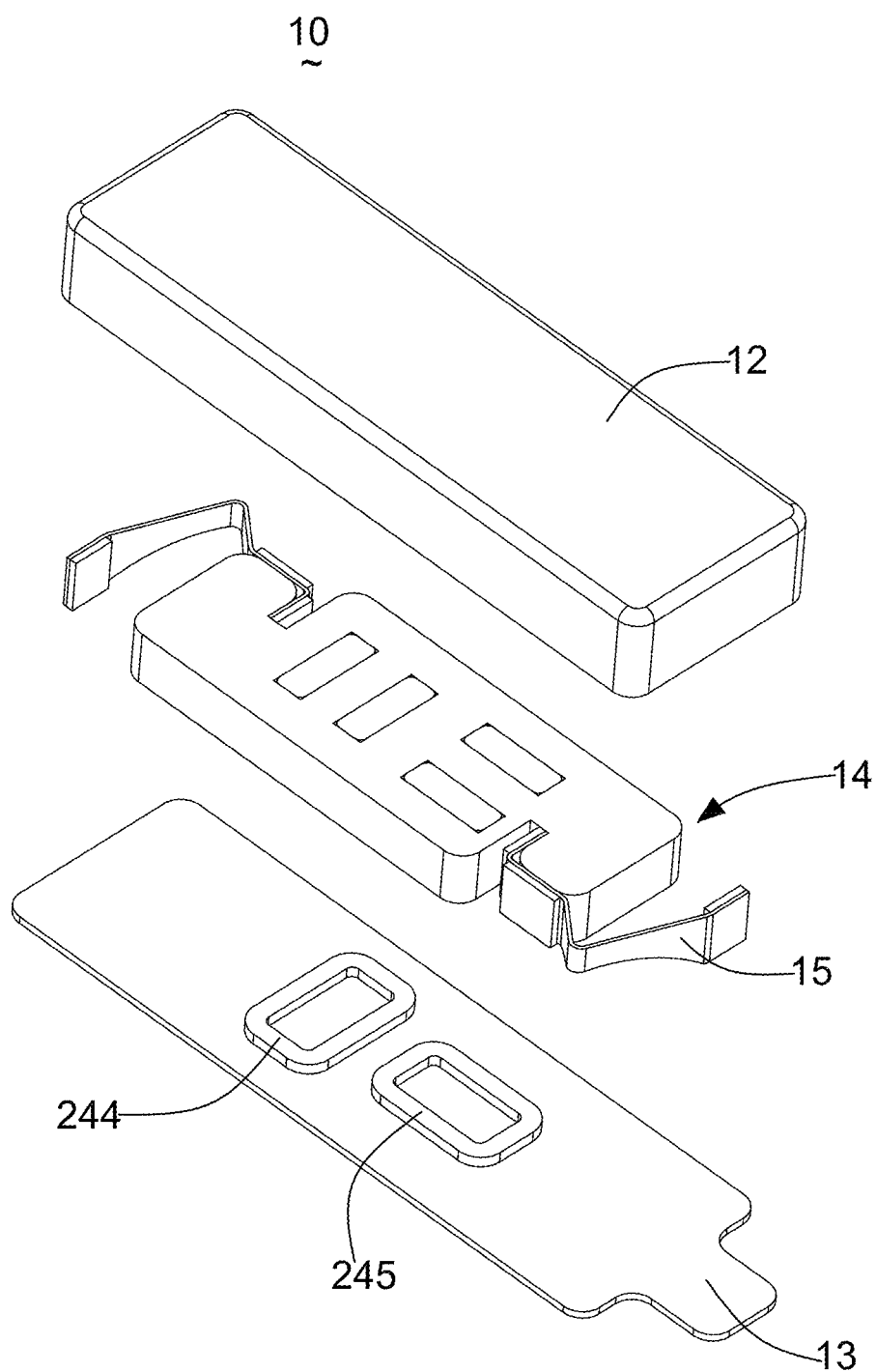
FIG. 2 is an exploded view of the vibration motor in FIG. 1.

Referring to FIGS. 1-2, a vibration motor 10, in accordance with a first embodiment of the present disclosure, comprises a cover 12, a substrate 13 forming an accommodation space together with the cover 12, a plurality of coils mounted on the substrate 13, and a vibrator 14 suspended by elastic members 15 in the accommodation space. The cover and the substrate serve as a housing. In this embodiment, the coils include a first coil 244 and a second coil 245.

Figure 3:
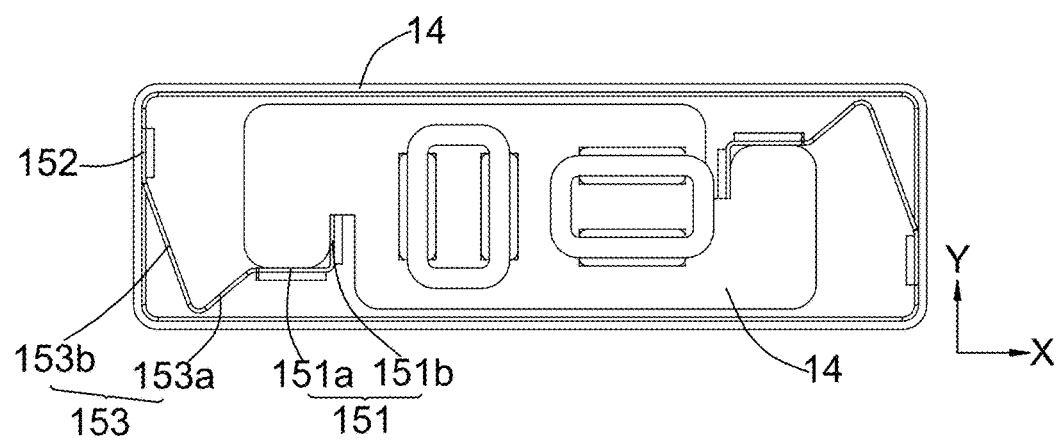
FIG. 3 is a bottom view of the vibration motor in FIG. 1, wherein a substrate thereof is removed.

Referring to FIG. 3, the vibrator 14 is suspended in the accommodation space by the elastic members 15. Each of the elastic members includes a first fixing part 151 connected to the vibrator 14, a second fixing part 152 connected to the cover 12, and an elastic arm connecting the first fixing part 151 to the second fixing part 152. For fixing the first fixing part 151 to the vibrator 14 firmly, the first fixing part 151 includes a first part 151a and a second part 151b respectively connected two adjacent sides of the vibrator. The elastic arm 153 includes a first arm 153a obliquely extending from the first fixing part 151, and a second arm 153b extending obliquely from the first arm 153a.

Figure 4:
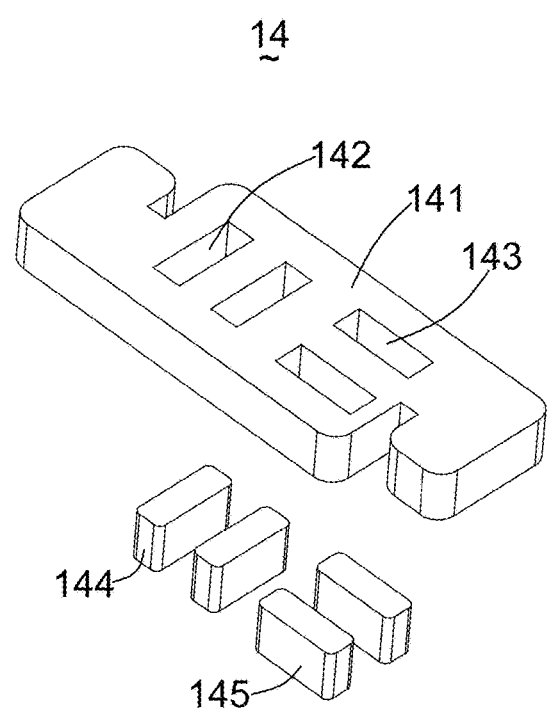
FIG. 4 is an exploded view of a vibrator of the vibration motor in FIG. 1.
Figure 5:
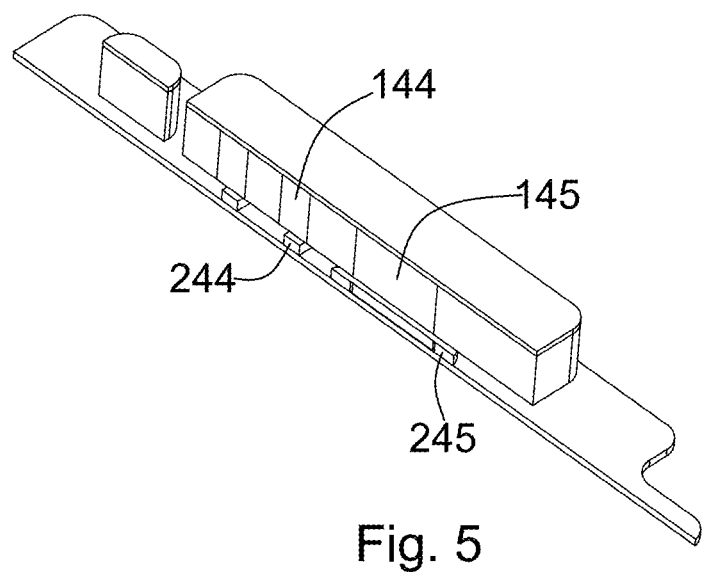
FIG. 5 is a cross-sectional view of the vibration motor in FIG. 1, wherein a cover thereof is removed.

Referring to FIGS. 4-5, the vibrator 14 includes a weight 141 provided with a first hole 142 and a second hole 143, a first magnet 144 received in the first hole 142, and a second magnet 145 received in the second hole 143. In the embodiment, the weight 141 forms two first holes 142 for receiving two corresponding first magnets 144 for providing a magnetic circuit corresponding to the first coil 244, and forms two second holes 143 for receiving two corresponding second magnets 145 for providing a magnetic circuit corresponding to the second coil 245.

When the first coil 244 is electrified, a first Ampere Force is accordingly generated to drive the vibrator 14 to vibrate along the X-direction (as shown in FIG. 3), and while the second coil 245 is electrified, a second Ampere Force is accordingly generated to drive the vibrator 14 to vibrate along the Y-direction (as shown in FIG. 3). By virtue of the configuration mentioned above, the vibrator is capable of vibrating along the X-direction when the first coil is electrified, or is capable of vibrating along the Y-direction when the second coil is electrified. For the vibration motor, a single vibrator can provide vibrations along two directions.

Figure 6:
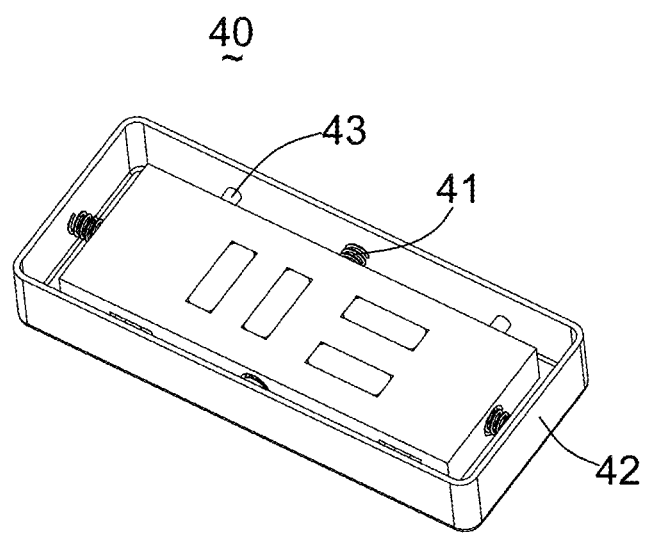
FIG. 6 is an isometric view of a vibration motor in accordance with a second exemplary embodiment of the present disclosure, wherein a substrate thereof is removed.
Figure 7:
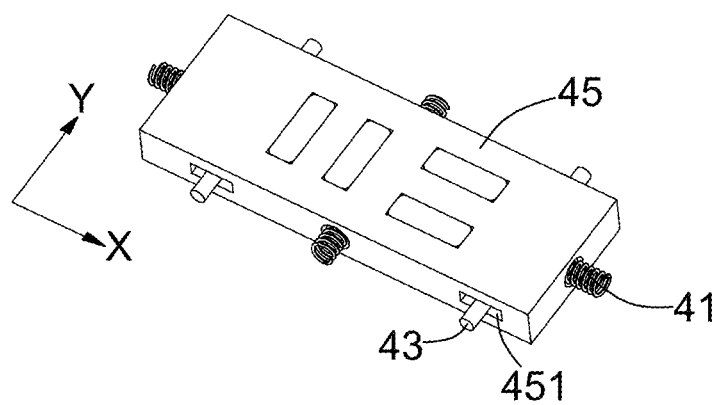
FIG. 7 is an isometric view of a vibrator of the vibration motor in FIG. 6.

Referring to FIGS. 6-7, a vibration motor 40 in accordance with a second exemplary embodiment of the present disclosure is disclosed. The vibration motor 40 includes a plurality of springs 41 each having one end fixed to a cover 42 and another end fixed to the vibrator. The springs suspend the vibrator in the cover. The vibrator includes a plurality of guiding holes 451 and a plurality of corresponding guiding pillars 43 received in the guiding holes 451 with two ends thereof extending out of the vibrator to be fixed to the cover. Similar to the first embodiment, in this embodiment, the vibrator is capable of vibrating along two directions. One of the directions is parallel to the guiding pillar 43 (Y-direction), i.e., the vibrator is capable of vibrating along the guiding pillar 43. The other of the direction is perpendicular to the guiding pillar 43 (X-direction), and the guiding hole 451 provides a space for vibration.

In the present disclosure, the first magnet serves as a first driver, the second magnet serves as a second driver, the first coil serves as a third driver, and the second coil serves as a fourth driver. The positions of the coil and the corresponding magnet could be switched. The first coil could be disposed in the weight, and the corresponding first magnet could be mounted on the substrate. Alternatively, the first coil and the second magnet could be arranged on the substrate, and on the same time, the first magnet and the second coil could be arranged in the weight.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
   a cover;
   a substrate forming an accommodation space together with the cover;
   a vibrator received in the accommodation space, the vibrator including a first driver and a second driver;
   a plurality of elastic members suspending the vibrator in the accommodation space;
   a third driver mounted on the substrate for generating a first force cooperatively with the first driver to drive the vibrator to vibrate along a first direction;
   a fourth driver mounted on the substrate for generating a second force cooperatively with the second driver to drive the vibrator to vibrate along a second direction;
   wherein the first driver is a first magnet, the second driver is a second magnet, the third driver is a first coil, and the fourth driver is a second coil;
   the vibrator includes a weight provided with a first hole and a second hole, the first magnet received in the first hole, and the second magnet received in the second hole;
   and the first direction is unparallel with the second direction.

2. The vibration motor as described in claim 1, wherein the elastic members are springs with one end connected to the vibrator and another end connected to the cover.

3. The vibration motor as described in claim 1, wherein the elastic member includes a first fixing part connecting to the vibrator, a second fixing part connecting to the cover, and an elastic arm connecting the first fixing part to the second fixing part.

4. The vibration motor as described in claim 3, wherein the elastic arm includes a first arm obliquely extending from the first fixing part, and a second arm extending obliquely from the first arm.

5. The vibration motor as described in claim 3, wherein the first fixing part includes a first part and a second part respectively connected to two adjacent sides of the vibrator.

6. The vibration motor as described in claim 2 further including a guiding pillar received in a guiding hole formed in the vibrator, wherein the pillar has two ends extending out of the vibrator and connecting to the cover for supporting the vibrator in the accommodation space.

7. The vibration motor as described in claim 6, wherein the guiding hole provides a space for the vibrator to vibrate relative to the guiding pillar.

8. The vibration motor as described in claim 1, wherein the first direction is perpendicular to the second direction.

9. The vibration motor as described in claim 1, wherein the first magnet is disposed perpendicular to the second magnet.

10. The vibration motor as described in claim 1, wherein the number of first magnet is two, two first magnets disposed in alignment, the number of second magnet is two, two second magnets disposed in alignment.

11. The vibration motor as described in claim 10, wherein the first coil is disposed opposite the two first magnets, and the second coil is disposed opposite to the two second magnets.

* * * * *